Dec. 31, 1935.  C. STANSBURY  2,025,911
INVERTER
Filed Jan. 19, 1931
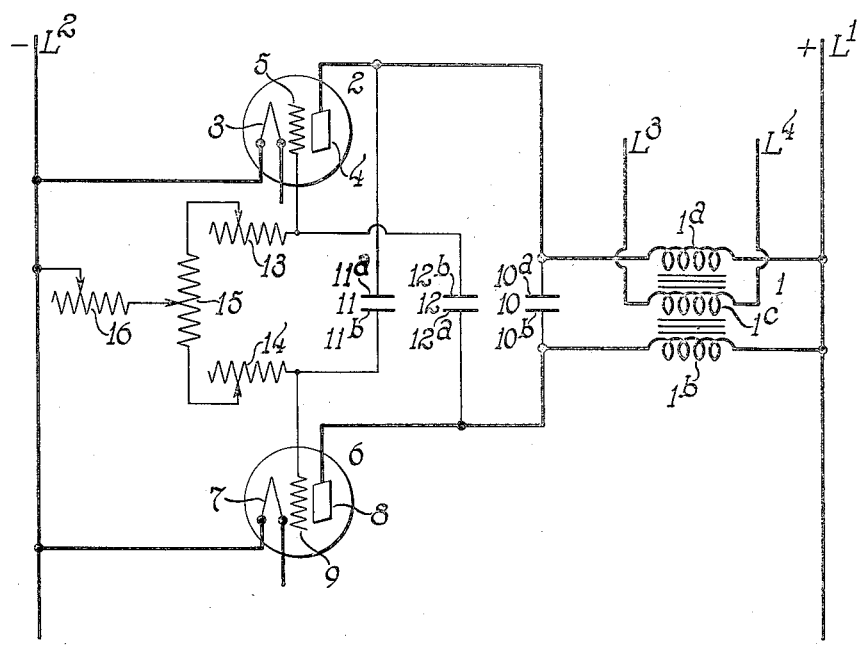
Inventor
Carroll Stansbury
By Franklin Hubbard
Attorney Patented Dec. 31, 1935

2,025,911

UNITED STATES PATENT OFFICE 2,025,911

INVERTER

Carroll Stansbury, Wauwatosa, Wis., assignor to Cutler-Hammer, Inc., Milwaukee, Wis., a corporation of Delaware Application January 19, 1931, Serial No. 509,551

12 Claims. (Cl. 175—363)

This invention relates to means for modifying electric current.

An object of the invention is to convert direct current into alternating current by means of electron tubes.

Another object is to provide for the control of the frequency of the alternating current produced.

Another object is to provide for independent regulation of the time interval during which current of alternate half waves of the converted current flow.

Another object is to provide for control of the frequency of the alternating current so as to be substantially independent of the load on the system.

Another object is to provide for converting direct current of the given voltage into alternating current of any desired voltage.

Other objects and advantages will hereinafter appear.

It is well known that a gaseous electron tube such, for instance, as a thermionic tube containing a gas, permits current flow only when the anode is positive with respect to the cathode. If such a tube is supplied with voltage from an alternating source, current flows only during that half cycle during which the anode is positive with respect to the cathode, which period is commonly called the working half cycle. If such a tube is provided with a control electrode or grid, the current during the working half cycle can only start to flow if the grid potential with respect to the cathode has a certain minimum value, the so-called critical voltage. This latter is the potential which when applied to the grid will prevent the starting of current flow between cathode and anode. By regulating the grid potential, it is thus possible to delay the start of current flow at will.

It is also known that if a gaseous electron tube is supplied with current from a direct current source so that the anode is positive with respect to the cathode, current will flow if the grid potential is of suitable value. Variation in grid potential has no effect on the current flow after it once is established but if the grid potential should be such that it exceeds the critical voltage while no current is flowing, the flow cannot be re-established again until the grid potential is reduced below the critical value. This phenomenon which is more fully described in my co-pending application, Serial No. 431,993 of February 27, 1930 is made use of in the present invention which will be described in connection with the single drawing accompanying the specification.

Referring to the drawing, $L^1$ and $L^2$ are respectively the positive and negative terminals of a direct current supply system. A transformer 1 having two similar primary windings $1^a$ and $1^b$ and a secondary winding $1^c$ has one end of each primary winding connected to the line $L^1$. The ends of the secondary winding are connected to terminals $L^3$ and $L^4$. The other ends of the primary windings are connected respectively in series with the gaseous thermionic tubes 2 and 6 to the line $L^2$.

The thermionic tube 2 has a heated cathode 3 which may be supplied with heating energy in any well known manner, an anode 4 and a grid 5. No current flow can be initiated through the tube when the grid potential with respect to the cathode is negative. The gaseous thermionic tube 6 is identical with the tube 2, having a heated cathode 7, an anode 8 and a grid 9. Connected between the anodes 4 and 8 is a condenser 10 with plates $10^a$ and $10^b$. A condenser 11 has plates of opposite polarity $11^a$ and $11^b$ which are connected respectively to the anode 4 and the grid 9, while a similar condenser 12 has plates $12^a$ and $12^b$ which are connected respectively to the anode 8 and the grid 5. An adjustable resistance 13 is connected to the junction between the grid 5 and the condenser plate $12^b$ and a similar resistance 14 is connected to the junction between the grid 9 and the condenser plate $11^b$. The other ends of the resistances 13 and 14 are connected together through a potentiometer resistance 15, having an adjustable tap which is connected through an adjustable resistance 16 to the line $L^2$.

The apparatus functions in the following manner:

If the terminals $L^1$ and $L^2$ are energized, the potential difference between these terminals is impressed upon the tubes 2 and 6. At the moment of closure of the circuit the grids 5 and 9 have the potential of their respective cathodes. Due to slight differences in the voltage necessary to start passage of current through the tubes, and slight differences in the impedances of the respective circuits, the initial voltage wave impressed upon the main electrodes of the two tubes will initiate current flow through one tube in advance of the other. Let it be assumed that current first begins to flow in tube 2. The instantaneous voltage at which discharge starts is somewhat above the drop between anode and cathode after current flow is established. Hence at the first moment of passage of current through the tube 2 the potential of the anode 4 with respect to the cathode 3 and, therefore, also the potential of condenser plate 10ª, is somewhat lowered, thus causing a corresponding drop of the potential of condenser plate 10ᵇ and anode 8 with respect to the cathode 7 of tube 6. The sudden flow of current through the tube 2 also changes the potential with respect to the line L² of the condenser plate 11ª which was that of line L¹, thus also causing a drop of the potential of condenser plate 11ᵇ and grid 9 so that the latter will further tend to prevent establishment of current flow through tube 6. However, the current which now flows in winding 1ª induces a voltage in winding 1ᵇ which quickly raises the voltage of plate 10ᵇ and anode 8ª with respect to cathode 7 to a value sufficient to start current flow through the tube 6 as soon as the condenser 11 has partially discharged so that the grid 9 permits such current flow.

The sudden flow of current through tube 6 causes a drop in potential of condenser plate 10ᵇ with respect to line L² and a corresponding drop of plate 10ª, thus reducing the voltage impressed upon the tube 2 to a value which stops current flow therein.

The sudden flow of current through tube 6 also changes the potential with respect to line L² of condenser plate 12ª which was in excess of that of line L¹ to a value approximately that of L² resulting in a corresponding drop to a high negative value with respect to line L² of the potential of plate 12ᵇ and grid 5. As long as grid 5 is highly negative with respect to its cathode 3 current flow through tube 2 cannot be reestablished. The high negative potential with respect to cathode 3 of condenser plate 12ᵇ and of grid 5, which is the result of the voltage drop through the resistor 16, 15, 13, is again reduced as the aforementioned current decreases and thus ultimately attains a value which again permits the tube 2 to pass current. As soon as the tube 2 has again become conducting through the reduction of the negative potential on grid 5, it will carry current through the primary winding 1ª and by action similar to that aforedescribed stop the flow of current through tube 6 and subject grid 9 to a transient negative potential due to the charging of condenser 11. Thus the tubes alternately supply current to the primary windings 1ª and 1ᵇ which in turn induce voltages of opposite polarity in the secondary winding of the transformer, and any suitable translating device may be connected to the terminals L³ and L⁴ of said transformer to be supplied with alternating current therefrom.

It will be obvious that the rate of discharge of the grid circuits depends upon the capacities of the corresponding condensers and upon the regulating resistances. By regulating the resistances 13 and 14 it is possible to regulate relatively the speed of discharge during alternate half cycles. By varying the adjustment of the potentiometer resistance 15, the discharge period of tube 2 may be increased while simultaneously that of tube 6 may be decreased or vice versa, while variation of the resistance 16 simultaneously varies the discharge period of the grid circuits of tubes 2 and 6.

It is obvious that by the adjustments above described, the frequency of the alternating current may be varied and it is equally obvious that any or all of the described adjustments may be omitted. It will also be understood that the frequency may be adjusted by adjusting the capacity of the condensers 11 and 12.

The capacity of the condenser 10 has no appreciable effect upon the frequency of the alternating current. It is only necessary that said condenser be sufficiently large to transfer the required amount of energy from anode 8 to anode 4 and vice versa so as to vary the respective potentials in a suitable manner. It is also apparent that the current flowing in the respective windings 1ª and 1ᵇ induces electro-motive forces in the other winding of such direction as to tend to stop current flow in the respective tube and under certain conditions the condenser 10 may be completely omitted and its function performed entirely by the two primary windings.

It is also possible to connect an alternating current translating device across the condenser plates 10ª and 10ᵇ and employ the resulting alternating current for the operation of the device. In this case, the transformer 1 may be replaced by two impedances, connected in series with the anodes 4 and 8 respectively. These impedances may be inductively related to each other in a manner similar to the primary windings 1ª and 1ᵇ, or, they may not be inductively interlinked.

Other modifications of the system will be apparent to one skilled in the art and such modifications are to be considered as coming within the scope of the disclosure and the appended claims.

What I claim as new and desire to secure by Letters Patent is:

1. In a system for converting a unidirectional voltage into a pulsating voltage of a given frequency, a source of unidirectional voltage, a unilaterally conducting gaseous discharge tube in circuit with said source and having a cathode, an anode and grid, an impedance to be subjected to said pulsating voltage in circuit with said tube and adapted to impress a potential between said anode and cathode to stop the discharge current of the tube, means to simultaneously impress a transient potential between said grid and cathode to prevent re-establishment of the discharge current of the tube and a discharge circuit associated with said grid and controlling the rate of change of the transient potential on the grid.

2. In a system for converting a unidirectional voltage into a pulsating voltage of a given frequency, a source of unidirectional voltage, a unilaterally conducting gaseous discharge tube in circuit with said source and having a cathode, an anode and grid, an impedance to be subjected to said pulsating voltage in circuit with said tube, means to simultaneously impress transient potentials between said cathode and said anode and grid respectively, to stop the discharge current of the tube and a discharge circuit associated with said grid and controlling the rate of change of the transient potential on the grid.

3. In a system for producing an alternating voltage of a given frequency from a direct current source, a uni-directional gaseous discharge tube having a cathode, an anode and grid, means to simultaneously impress transient potentials between said cathode and said anode and grid respectively, to stop the discharge current of the tube, a discharge circuit associated with said grid and controlling the rate of change of the transient potential on the grid and an impedance in series with said tube.

4. In a system for producing an alternating voltage of a given frequency from a direct current source, a uni-directional gaseous discharge tube having a cathode, an anode and grid, means to simultaneously impress transient potentials between said cathode and said anode and grid respectively, to stop the discharge current of the tube, an energy storing discharge circuit associated with said grid to control the rate of change of the transient potentials of the grid and an impedance in series with said tube.

5. In a system for producing an alternating voltage of a given frequency from a direct current source, a uni-directional gaseous discharge tube having a cathode, an anode and grid, means to simultaneously impress transient potentials between said cathode and said anode and grid respectively, to stop the discharge current of the tube, an impedance in series with said tube and an adjustable energy storage circuit which retards the discharge of the transient potential on said grid, whereby the rate of change of the transient potential impressed upon the grid may be regulated, to thereby regulate the frequency of the alternating voltage.

6. In combination, a direct current supply, an alternating current translating device, a gaseous discharge tube in circuit with said supply and said translating device and having a cathode, an anode and grid, means to simultaneously impress transient potentials between said cathode and said anode and grid respectively, to stop the flow of current through said tube and an energy storage circuit associated with said grid to control the rate of change of the transient potential of the grid.

7. In combination, a direct current supply, an alternating current translating device, a gaseous discharge tube in circuit with said supply and said translating device and having a cathode, an anode and grid, a second tube, means to connect said second tube in circuit whereby transient potentials are produced simultaneously between said cathode and said anode and grid respectively, which stop the flow of current through the first tube and an energy storage circuit associated with said grid to control the rate of change of the transient potential on the grid.

8. In combination, a direct current supply, an alternating current translating device, two gaseous discharge tubes in circuit with said supply and said translating device and each having a cathode, an anode and grid, means associated with each tube to produce simultaneously transient potentials between the cathode and the anode and grid respectively, of the other tube to stop the flow of current therethrough, and adjustable energy storage circuits whereby the time intervals during which the grids maintain their respective tubes non-conducting may be regulated.

9. In combination, a direct current supply, an alternating current translating device, two gaseous discharge tubes in circuit with said supply and said translating device and each having a cathode, an anode and grid, energy storage means associated with each tube and capable of producing simultaneously transient potentials between its cathode and anode and grid respectively, as a function of starting of current flow in the other tube and adjustable energy storage circuits whereby the time intervals during which the grids maintain their respective tubes non-conducting may be regulated.

10. In combination, a direct current supply, an alternating current translating device, two gaseous discharge tubes in circuit with said supply and said translating device and each having a cathode, an anode and grid, means to control the frequency of the current supplied to said translating device, said means including means to alternately impress transient potentials between said cathodes and said anodes and grids respectively to stop the discharge current of the respective tube and adjustable energy storage means whereby the time intervals during which the grids maintain the respective tubes non-conducting may be regulated.

11. In a system for producing an alternating voltage of a given frequency from a direct current source, a unidirectional gaseous discharge tube having a cathode, an anode and a grid, means to impress simultaneously transient potentials between said cathode and said anode and grid respectively, to control the discharge current of the tube, an energy storing circuit associated with said grid to control the rate of change of the transient potential of the grid and an impedance in series with said tube.

12. In combination, a direct current supply, an alternating current translating device, two gaseous discharge tubes in circuit with said supply and said translating device and each having a cathode and anode and a grid, an energy storage means associated with each tube and capable of producing simultaneously transient potentials between its cathode and anode and grid respectively, as a function of starting current in the other tube and energy storage circuits whereby the time intervals during which the grids maintain their respective tubes non-conducting may be regulated.

CARROLL STANSBURY.